(12) United States Patent
Ewing

(10) Patent No.: US 8,758,614 B2
(45) Date of Patent: Jun. 24, 2014

(54) ANAEROBIC MEMBRANE BIOREACTOR FOR TREATING A WASTE STREAM

(71) Applicant: Veolia Water Solutions & Technologies Support, Saint-Maurice Cedex (FR)

(72) Inventor: John Ewing, Camden, NJ (US)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 0 days.

(21) Appl. No.: 13/674,294

(22) Filed: Nov. 12, 2012

(65) Prior Publication Data

US 2013/0075328 A1   Mar. 28, 2013

Related U.S. Application Data

(63) Continuation of application No. 12/760,168, filed on Apr. 14, 2010, now abandoned.

(51) Int. Cl.
*C02F 3/28* (2006.01)
*C02F 11/04* (2006.01)

(52) U.S. Cl.
USPC .......................................... 210/603; 210/612

(58) Field of Classification Search
USPC .................. 210/603, 605, 612, 613, 630, 631
See application file for complete search history.

(56) References Cited

U.S. PATENT DOCUMENTS

| 4,503,154 | A | * | 3/1985 | Paton ............................. 435/167 |
| 4,735,724 | A | * | 4/1988 | Chynoweth et al. .......... 210/603 |
| 5,409,610 | A | | 4/1995 | Clark |
| 5,824,222 | A | * | 10/1998 | Keyser et al. .................. 210/607 |
| 6,143,176 | A | | 11/2000 | Nagamatsu et al. |
| 6,790,359 | B2 | * | 9/2004 | Miller, III ...................... 210/603 |
| 2002/0079266 | A1 | | 6/2002 | Ainsworth et al. |
| 2006/0027496 | A1 | * | 2/2006 | Campion et al. .............. 210/605 |
| 2006/0163155 | A1 | | 7/2006 | Chauzy et al. |
| 2010/0191377 | A1 | * | 7/2010 | Smith et al. .................... 700/271 |

FOREIGN PATENT DOCUMENTS

| CN | 101186416 A | 5/2008 |
| CN | 101215045 A | 7/2008 |
| CN | 101298350 A | 11/2008 |
| EP | 215988 A1 | 1/1987 |
| JP | 2001170631 A | 6/2001 |
| JP | 2005199258 A | 7/2005 |
| JP | 2006075730 A | 3/2006 |
| JP | 2009154156 A | 7/2009 |

OTHER PUBLICATIONS

CN Search Report issued Aug. 1, 2013 in re CN Application No. 201180028179.6 filed Dec. 7, 2012.

* cited by examiner

*Primary Examiner* — Fred Prince
(74) *Attorney, Agent, or Firm* — Coats and Bennett PLLC

(57) ABSTRACT

A waste stream having anaerobically biodegradable components is fed to an anaerobic reactor where the components react with microorganisms to biodegrade the components and produce biomass and biogas. Mixing occurs in select portions of the anaerobic reactor, particularly the bottom and top portions of the reactor. Relatively heavy solids settle to the bottom and are mixed with the mixed liquor while relatively light or fine solids float to the top portion of the anaerobic reactor where they are mixed with the mixed liquor. Mixed liquor is pumped from an intermediate portion of the anaerobic reactor to a membrane separation unit where the mixed liquor is separated into a permeate stream and a retentate stream that is concentrated with solids.

4 Claims, 2 Drawing Sheets

ANAEROBIC MEMBRANE BIOREACTOR FOR TREATING A WASTE STREAM

CROSS-REFERENCE TO RELATED APPLICATIONS

The present application is a continuation of U.S. patent application Ser. No. 12/760,168 filed Apr. 14, 2010 entitled "Anaerobic Digester-Membrane Bioreactor for Treating a Waste Stream" now abandoned. The contents of this application is expressly incorporated herein by reference.

FIELD OF INVENTION

The present invention relates to an anaerobic membrane bioreactor for treating waste streams having biodegradable total solids including soluble and insoluble COD.

SUMMARY

The present invention relates to a system and method of treating a waste stream having anaerobically biodegradable solids. The waste stream is directed into an anaerobic reactor and the biodegradable solids are converted by anaerobic biomass in the anaerobic reactor to reduce the amount of biodegradable solids and in the process produce biogas and biomass. The system and process stratifies the mixed liquor in the anaerobic reactor into at least three distinct mixed liquor zones. The first zone located at the bottom of the tank includes a relatively higher concentration of solids, specifically heavier biological and precipitated solids; the second zone above the first zone and located in the middle of the tank height includes a relatively low concentration of solids; and the third zone located near the top of the tank contains a relatively higher concentration of biomass than the middle zone and these solids consist mainly of lighter solids. Mixed liquor in the middle stratified zone is pumped to a membrane separation unit, the membrane separation unit can be submerged or external, such as tubular, flat sheet, or hollow fiber membranes. In the membrane unit is where the mixed liquor is separated into a permeate stream and a retentate stream. Stratification enhances the overall performance of the system. This results in a higher concentration of solids being maintained in the reactor while supplying a less concentrated stream to the membrane separation unit. Over time this enhances the highest possible membrane flux rates per unit of membrane system energy input and prevents or reduces fouling and in turn prolongs the life of the membranes of the membrane separation unit by minimizing the number of clean in place (CIP) cycles. The retentate stream is recycled to the anaerobic reactor to maintain longer solids retention time (SRT).

In one embodiment, a solids separation system is incorporated into the overall system and process. In this case, mixed liquor including solids is pumped from the first lower zone to a solids separator such as a hydrocyclone. At the hydrocyclone, the mixed liquor is separated into two streams, the first stream having a relatively high concentration of heavier solids including most of the precipitated inorganics, and a second stream having a relatively low concentration of precipitated inorganic solids and a higher relative concentration of biological solids. The stream having the relatively higher concentration of biological solids is recycled back to the anaerobic reactor to maintain a higher SRT.

In another embodiment, the present invention entails an anaerobic membrane bioreactor that includes an anaerobic reactor that is operative to stratify mixed liquor in the anaerobic reactor. In this embodiment, the anaerobic reactor includes one or more mixers disposed in the lower portion of the reactor and one or more mixers disposed in the upper portion of the reactor. The anaerobic reactor is operative to form a first mixed liquor zone in a lower portion of the reactor, and a second mixed liquor zone in an upper portion of the reactor. This leaves an intermediate mixed liquor zone generally disposed between the upper and lower zones. Solids suspended in the upper and lower mixed liquor zones are mixed by the one or more mixers disposed in the respective zones. In one embodiment, mixed liquor contained in the intermediate zone is relatively unmixed or is unmixed. The mixed liquor in the intermediate zone in one embodiment is pumped to the membrane separation unit which separates the mixed liquor into a permeate stream and a retentate stream. One option is to return the retentate stream to the anaerobic reactor for further treatment.

Other objects and advantages of the present invention will become apparent and obvious from a study of the following description and the accompanying drawings which are merely illustrative of such invention.

DETAILED DESCRIPTION

Figure 1:
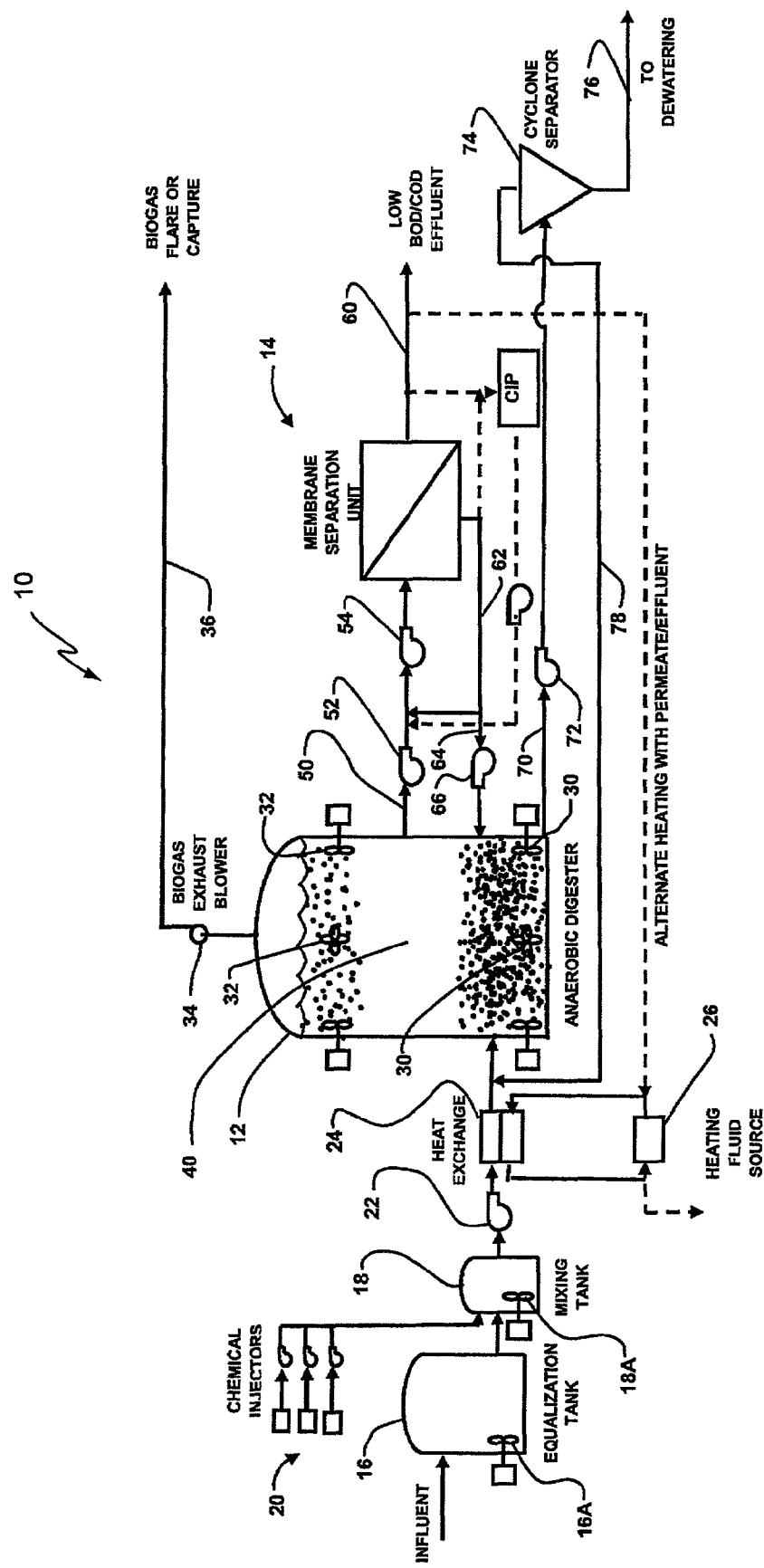
FIG. 1 is a schematic illustration of the anaerobic membrane bioreactor and process of the present invention.

With further reference to the drawings, particularly FIG. 1, an anaerobic membrane bioreactor (sometimes referred to by AnMBR) is shown therein and indicated generally by the number 10. As is discussed herein in detail, the anaerobic membrane bioreactor 10 is a compact purification system combining an anaerobic digestion process with a membrane separation process. The system and process is effective to treat waste streams having biodegradable constituents or components by digesting these constituents and producing biogas and new biomass. The anaerobic membrane bioreactor 10 basically comprises an anaerobic reactor 12 and a membrane separation unit 14. Effluent from the anaerobic reactor 12 is directed to the membrane separation unit 14 that separates the effluent from the anaerobic reactor into a permeate stream and a retentate stream where the retentate stream is concentrated with solids including biomass. The concentrated retentate stream is recycled back to the anaerobic reactor and mixed with the mixed liquor therein. The goal of the recycling is to maintain a relatively higher than usual mixed liquor suspended solids (MLSS) content inside the reactor 12, and thus prolong the SRT. A typical range of MLSS concentration inside the anaerobic membrane bioreactor system would be 0.1-6% solids (1,000-60,000 mg/L as TSS).

In the embodiment solids are removed from the anaerobic reactor 12 by pumping mixed liquor from the bottom zone to a solids separator such as a hydrocyclone. The solids separator separates the heavier solids, including the inorganic precipitants formed in the reactor from the lighter solids including a higher concentration of biomass. This higher in concentration biomass stream is recycled back to the anaerobic reactor 12. The retentate (heavier separated solids) can be subjected to further treatment such as treatment in a dewatering unit. The purpose of the solids separator is to maintain or control SRT and to remove from the reactor 12 the buildup of heavy inorganic solids. It should be appreciated that there are various ways of removing solids from the reactor 12. Solids can be directly removed, or as described in more detail subsequently herein, solids can be removed by directing mixed liquor from a certain area or zone of the reactor 12 to a solids separator such as a hydrocyclone. In other embodiments, solids can be removed by directing a portion of the retentate stream of the membrane separation unit 14 to a solids separator such as a hydrocyclone.

It is beneficial to explain or describe the term "solids" as used in the present application. Total solids (TS) in environmental systems are defined as all constituents present in a given sample, namely as dissolved solids (TDS) and suspended solids (TSS), besides water. A part of the total solids are biodegradable solids, both soluble and suspended, that have a certain chemical oxygen demand (COD) associated with them.

Forming a part of the anaerobic membrane bioreactor 10 is the anaerobic reactor 12. Anaerobic reactor 12 is designed to provide mechanical mixing in a bottom portion of the reactor and mechanical mixing in an upper or top portion of the reactor. In a preferred embodiment there is no mechanical mixing or relatively little mixing in the intermediate or middle portion of the anaerobic reactor. In the reactor 12, heavy solids, including larger biological flocks and inorganic precipitated solids that form, tend to settle to the bottom portion of the reactor and are mixed with the mixed liquor therein by the mixing that takes place in the bottom portion of the reactor. Other lighter or finer solids tend to float to the upper portion of the reactor where the mechanical mixing that takes place in the upper portion of the reactor maintains these solids in suspension at the top of the reactor. This tends to stratify the mixed liquor in the anaerobic reactor 12 into three distinct zones. That is, the concentration of solids in the intermediate portion of the reactor is lower compared to the concentration of solids in the bottom or upper portion of the reactor.

Downstream from the anaerobic reactor 12 is a membrane separation unit 14. Mixed liquor is pumped from the intermediate portion or zone of the anaerobic reactor 12 to the membrane separation unit 14. Because of the stratification of the mixed liquor in the anaerobic reactor 12, the mixed liquor pumped to the membrane separation unit 14 includes a relatively lower solids concentration. When it is stated that the mixed liquor in the intermediate portion or zone of the anaerobic reactor 12 includes a relatively lower solids concentration, it is meant that the concentration of solids in this portion of the anaerobic reactor is lower relative to the concentration of solids in the bottom portion of the anaerobic reactor and the uppermost portion of the reactor. There are numerous advantages to directing the mixed liquor from the intermediate portion or zone of the anaerobic reactor 12 to the membrane separation unit 14. Overall the stratification that occurs in the reactor 12 serves to enhance the overall performance of the system. By stratifying the mixed liquor in the reactor 12, a higher concentration of solids is maintained in the reactor while supplying a less concentrated stream to the membrane separation unit 14. This prevents or reduces membrane fouling and enhances the highest possible membrane flux rates per unit of membrane system energy input and in turn prolongs the life of the membranes that comprise the membrane separation unit 14 by minimizing the number of clean in place (CIP) cycles. The membrane separation unit 14 separates the mixed liquor into a permeate stream that is relatively pure and includes low concentrations of COD, BOD and TSS, and a retentate stream that includes more concentrated solids including biomass which is recycled to the anaerobic reactor 12 and mixed with the mixed liquor in the anaerobic reactor.

The present invention also entails a method of treating a stream containing soluble and insoluble COD in an anaerobic membrane bioreactor. In this regard, the method entails feeding the stream having soluble and insoluble COD into an anaerobic reactor tank. Thereafter the process entails reacting the soluble and insoluble COD with anaerobic biomass in the anaerobic reactor to reduce the amount of soluble and insoluble COD and in the process produce a mixed liquor and biogas in the anaerobic reactor. One or more mixers are disposed in a lower portion of the anaerobic reactor to mix the relatively heavy solids in the mixed liquor. There is also provided in one embodiment, one or more mixers in the upper portion of the anaerobic reactor for mixing the relatively light solids in the mixed liquor. This leaves an intermediate portion or zone of the anaerobic reactor where there is a relatively lower concentration of solids in the mixed liquor. The mixed liquor is pumped from the intermediate portion of the anaerobic reactor 12 to a membrane separation unit 14 where the mixed liquor is separated into a permeate stream and a retentate stream that contains a substantial concentration of biomass. At least a portion of the retentate stream is recycled to the anaerobic reactor 12. The method further includes, in one embodiment, pumping mixed liquor with the relatively heavy solids from the bottom portion of the anaerobic reactor 12 to a solids separator and separating the heavier solids from the lighter solids containing biomass. Finally, at least a portion of the lighter solids containing the biomass is recycled to the anaerobic reactor.

The above discussion presents an overview of the anaerobic membrane bioreactor 10 and the process for treating a waste stream. Attention is now directed to the individual components of the anaerobic membrane bioreactor 10 and to the various processes performed.

Located upstream from the anaerobic reactor 12 is an equalization tank 16. Equalization tank 16 includes one or more mixers 16A. As viewed in FIG. 1 a waste stream or feedwater stream is directed into the equalization tank 16 and can be mixed by the one or more mixers 16A. Various waste streams can be treated according to the process described herein. In general, the waste streams will include material or matter that is at least partially biodegradable by anaerobic bacteria or biomass. Examples of waste streams that can be treated by the system or process disclosed herein are: sludge streams from municipal sewage treatment plants; sludge streams from industrial wastewater treatment facilities; waste streams from agricultural operations; high strength waste streams from industrial operations; and any other liquid wastewater streams that are biologically treatable in an anaerobic reactor.

Disposed downstream from the equalization tank 16 is a mixing tank 18. Mixing tank 18 includes one or more mixers 18A. Associated with mixing tank 18 is one or more chemical injectors indicated generally by the numeral 20. Chemical injectors 20 function to inject various chemicals into the mixing tank 18, which are then mixed with the waste stream. Various chemicals can be injected into the mixing tank depending on the make up of the waste stream and what conditions are desired to be maintained throughout the process, and objectives of the treatment. For example, it may be desirable to control the pH throughout the process, and in that case a caustic such as NaOH can be injected and mixed into the waste stream. Other chemicals such as iron salts, necessary mineral elements for optimal anaerobic production of biogas, for example, can also be added if desired. In some embodiments the mixing tank 18 may be unnecessary. Here the chemical or chemicals could be injected directly into a line or conduit through which the waste stream passes.

The influent contained in the mixing tank 18 is directed to a reactor feed pump 22. Reactor feed pump 22 pumps the waste stream through a heat exchanger 24. Heat exchanger 24 is operatively associated with a heat source 26 that provides a heating medium to the heat exchanger for heating the waste stream passing through the heat exchanger. In one embodiment, the heat source 26 is a heat source that is independent of other processes performed by the anaerobic membrane bioreactor 10. In one embodiment the permeate produced by the system can be recirculated back through the heat exchanger 24 to provide heat for heating the incoming waste stream. Further, as explained subsequently herein, the anaerobic reactor 12 produces a biogas and the biogas can be utilized by the heat source 26 for heating the medium directed to the heat exchanger 24.

From the heat exchanger 24, the waste stream is directed into the anaerobic reactor 12. Anaerobic reactor 12 is a closed system designed to maintain anaerobic conditions within the reactor. Anaerobic reactor 12 can be of various sizes and capacities.

The waste stream introduced into anaerobic reactor 12 is mixed with the existing material or matter in the reactor to form mixed liquor. Generally, the biodegradable components in the waste stream react with anaerobic biomass, including anaerobic (and facultative) bacteria and methanogenic archea, and reduce the amount of biodegradable solids contained within the reactor, and in the process produce biogas and additional biological solids. The term "mixed liquor" as used herein includes, but is not limited to, a mixture of organic and inorganic solids, including biomass, biodegradable and non biodegradable waste, water and biogas. The mixed liquor may reside within the reactor or be fed into the reactor as a recycled stream from the membrane system.

Anaerobic reactor 12 is designed to stratify the mixed liquor. As seen in FIG. 1 the heavier solids occupy one region in the anaerobic reactor, and fine or light solids occupy another region in the anaerobic reactor. And in one region, the mixed liquor is relatively free of at least the heavier solids or includes a solids concentration that is measurably less than the concentration of solids found in other regions or areas within the reactor. More particularly, the reactor 12 is designed to stratify the solids as follows. The relatively heavy and larger solids tend to settle into a bottom portion of the reactor. The relatively finer or lighter solids tend to float to the top portion of the reactor. This leaves an intermediate or middle portion 40 of the reactor that is measurably lower in solids, or at least includes a solids concentration that is measurably less than the solids concentration in the bottom portion of the anaerobic reactor.

Strategically placed in the anaerobic reactor 12 is a series of mixers. First there is one or more mixers 30 located in the bottom or lower portion of the reactor. Further there is one or more mixers 32 located in the top or upper portion of the reactor 12. Thus, it is appreciated that in one embodiment, there are no mixers located in the intermediate or middle region of the anaerobic reactor. Mixing the mixed liquor in the lower and upper portions of the reactor 12 improve and enhance reactions between the anaerobically digestible components and the anaerobic biomass. Furthermore, for example, the mixing in the upper portion of the reactor prevents the solids from forming a blanket in the upper portion of the reactor 12.

Mixers 30 and 32 provide a mixing action, resulting in the bottom and top portion of the anaerobic reactor being completely mixed. Various types of mixers can be used. In one embodiment the mixers are what is referred to as sidewall mounted mixers. These mixers project through the sidewall of the anaerobic reactor 12 with the propeller or mixing portion of the mixers being disposed internally within the reactor 12. Mixers 30 and 32 are generally uniformly spaced so as to provide a uniform mixing of the mixed liquor in the top and bottom portions of the reactor. Although mechanical mixers are discussed and shown in the drawings, other types of conventional anaerobic reactor mixers can be used. For example, mixing can be accomplished by gas injection, mechanical streams, and mechanical pumps.

The depth and precise location of the stratified layers in the anaerobic reactor 12 can vary. In the way of an example, assume that the anaerobic reactor 12 is approximately 50 feet high. In such a case the bottom mixers 30 could be centered at approximately 3 feet from the bottom of the anaerobic reactor. Upper mixers 32 could be centered at approximately 38 feet from the bottom of the anaerobic reactor. In this case, at a height of 20 to 25 feet from the bottom of the anaerobic reactor, at least a portion of the intermediate or middle zone 40 would be located. Thus, in this example, line 50, which feeds mixed liquor from the anaerobic reactor 12 to the membrane separation unit 14, would be plumbed into the wall of the anaerobic reactor 12 at an intermediate point between 20 and 25 feet from the bottom of the anaerobic reactor. At this point the mixed liquor pumped from the anaerobic reactor would likely have a solids concentration less than the mixed liquor disposed in the bottom of the reactor.

Digesting solids will produce biogas. Biogas produced in the lower mixing zone will rise through the length of the reactor and provide gentile low shear mixing of the mixed liquor in the intermediate zone. Reactor 12 is provided with a biogas outlet that can pass by the force created by the biological production of biogas or can be enhanced through utilization of an exhaust blower 34 and a biogas outlet 36. Biogas outlet 36 leads to a flare or can be directed to a boiler, generator, or other device that can use the biogas to create usable energy.

As appreciated by those skilled in the art, the anaerobically biodegradable material contained in the waste stream is digested through reactions in the reactor 12 where anaerobic (and facultative!) bacteria and methanogenic archaea convert the biodegradable material to biogas which is substantially made up of methane and carbon dioxide and other lesser amounts of other elements in gaseous form such as hydrogen sulfide. These gaseous components are generally referred to herein as "biogas". Biogas may also contain small amounts of water vapor, ammonia, and traces of other volatile compounds which may be present in the waste stream or form during biodegradation. Resulting composition of the biogas by volume percent will vary depending on the particular digestible organics being processed. Preferred methane levels in biogas formed in the reactor 12 are in the range of about 50 to about 90 volume percent. Preferred carbon dioxide levels are in the range of about 5 to about 45 percent (by volume) and hydrogen sulfide levels can range from about 200 ppm (volume) to about 3 percent by volume.

Downstream from the anaerobic reactor 12 is the membrane separation unit 14. Mixed liquor from the anaerobic reactor 12 is directed to the membrane separation unit 14. In particular, the mixed liquor is taken from the intermediate or middle zone 40 of the anaerobic reactor. This means that the mixed liquor directed from the anaerobic reactor 12 to the membrane separation unit 14 includes a solids concentration less than would typically be found in the mixed liquor located in the bottom or top portion of the anaerobic reactor 12. As seen in FIG. 1, line 50 is operatively interconnected between the anaerobic reactor 12 and the membrane separation unit 14 and serves to direct or channel mixed liquor from the reactor to the membrane separation unit. Operatively connected in line 50 is a membrane feed pump 52. Pump 52 pumps the mixed liquor from the reactor 12 through line 50 to the membrane separation unit. The membrane feed pump provides a baseline pressure to the membrane separation unit. In one embodiment, the membrane feed pump is replaced with a flow control valve where by the gravitational force created by the liquid level in the reactor provides the necessary baseline pressure to the membrane separation unit. The membrane separation unit 14 is a continuously recirculated hydraulic loop that includes the membrane modules, the membrane recirculation pump referred to as pump 54, and required membrane performance controls. The membrane recirculation pump 54 pumps the mixed liquor in a constant recirculation loop around the membrane separation unit 14 to provide necessary cross-flow velocity.

Basically the membrane separation unit 14 filters or separates the mixed liquor into two streams, a permeate stream that is directed from the membrane separation unit 14 through a permeate line 60, and a retentate stream that is directed from a membrane separation unit through a retentate line 62. Note that retentate line 62 is also a recycle line as it recycles the retentate stream back to line 50 just upstream of membrane feed pump 54. This permits membrane feed pump 54 to continuously recycle the retentate stream through the membrane separation unit.

At least a portion of the retentate stream is returned to the anaerobic reactor 12 and mixed with the mixed liquor therein. To return a portion of the retentate stream to the anaerobic reactor 12 there is provided a return line 64. Thus, as noted above, a portion of the retentate stream is taken off the recycle line 62 and returned via reactor recirculation pump 66 to the anaerobic reactor 12. In one embodiment, pump 66 is replaced with a flow control valve and the force required to return mixed liquor to the reactor is provided by the membrane feed pump, pump 52.

Membrane separation unit 14 retains all or substantially all suspended solids, thus, all or substantially all suspended solids are recycled back to the anaerobic reactor. Various types of membrane separation units 14 can be employed.

Figure 2:
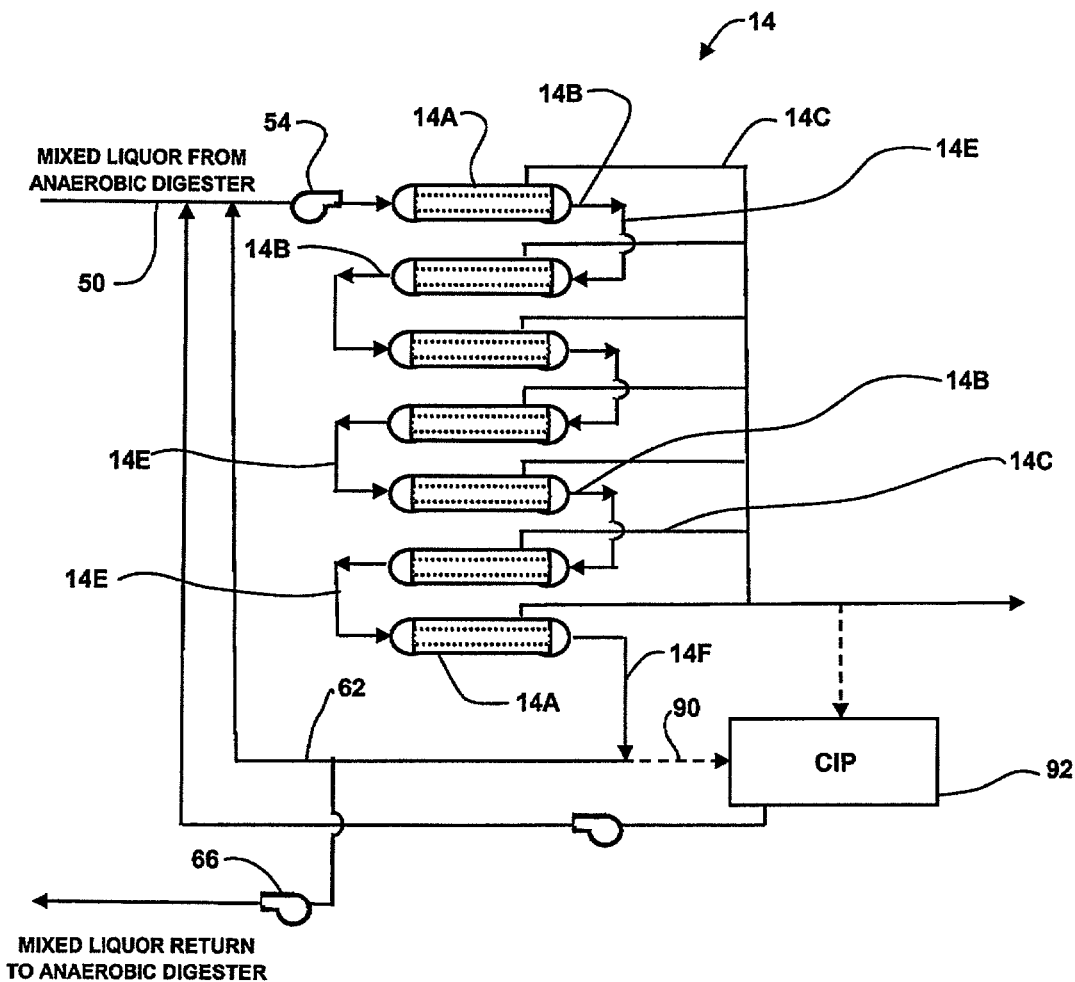
FIG. 2 is a schematic illustration showing an exemplary membrane separation unit.

With reference to FIG. 2, a schematic illustration is shown therein for an exemplary membrane separation unit 14. It is appreciated by those skilled in the art that various types of conventional membrane filtration devices can be employed. FIG. 2 illustrates one exemplary membrane filtration unit which can be used as a part of the anaerobic membrane bioreactor 10. In the case of the membrane filtration unit 14 shown in FIG. 2, the same is a sidestream system inasmuch as the membranes are located outside of the anaerobic reactor 12. In the exemplary membrane filtration unit 14, there is provided a series of cross flow membrane modules 14A. The number of membrane modules 14A can vary depending on the makeup of the feedwater and treatment objectives. Membrane modules 14A are connected in series in this example. Each membrane module 14A includes an elongated housing with tubular membranes contained therein. As noted above, the membranes of this example are tubular-type membranes that extend longitudinally through the housing of each membrane module 14A. Effluent from the reactor 12 is directed into the individual tubular membranes under pressure. As the feed or mixed liquor from the anaerobic reactor 12 passes through the individual membranes, a permeate will be produced and the permeate will flow outwardly, in a cross flow direction relative to the feed. The permeate in each membrane module 14A will be collected and directed out a permeate outlet 14C provided on each membrane module 14A. Retentate is directed out a retentate outlet 14B disposed on one end of each module 14A. Respective retentate outlets and retentate inlets are interconnected by connecting lines 14E. This allows the retentate from one membrane module 14A to be directed into another downstream membrane module 14A. Thus, as seen in FIG. 2, the respective membrane modules 14A are either singular or multiple units connected in series such that the retentate flows linearly through the singular or series of connected membrane modules 14A.

The retentate exiting the last membrane module 14A is directed into a final outlet line 14F that is connected to the retentate line 62 shown in FIG. 1. This enables the retentate to be recycled back to the inlet of the membrane filtration unit 14 or back to the reactor 12. In one embodiment, there is a substantial amount of the retentate from the membrane filtration unit 14 recycled back to the inlet of the membrane filtration unit.

In addition, the final outlet line 14F is communicatively connected to a cleaning line 90 that leads to a clean-in-place (CIP) unit 92. The clean-in-place unit 92 is a system or unit that is operative to periodically, or from time-to-time, clean the membrane filtration unit 14 by backwashing the respective membranes that make up the unit. Various membrane cleaning systems can be employed. Here the clean-in-place unit 92 is designed to utilize the retentate or retentate from the membrane filtration unit 14 to backwash and clean the respective membranes of the membrane filtration unit. Details of the clean-in-place unit 92 are not dealt with here in detail because such systems or units and how they operate are well known and appreciated by those skilled in the art.

The anaerobic membrane bioreactor 10 also includes a system and process for removing solids from the anaerobic reactor 12. More particularly, there is a solids separation process that includes a solids separator 74 such as a hydrocyclone separator. The solids separator is designed to preferentially separate heavy solids which include a relatively high percentage of inorganic precipitants, from the lighter solids which include a relatively high concentration of biomass. As noted above, solids are removed from the anaerobic reactor 12 in order to maintain or control SRT. In addition, there can be a substantial buildup of heavy inorganic solids within the anaerobic reactor 12 and these solids can be removed by directing them from the anaerobic reactor to a solids separator. In any event, there are various ways of removing solids from the anaerobic membrane bioreactor 10. For example, in one embodiment, solids can simply be wasted from the anaerobic reactor 12 in conventional fashion. In another example, solids can be removed from the retentate stream leaving the membrane separation unit. In this case a selected or controlled amount of the retentate stream can be directed to a solids separator. In the embodiment illustrated herein, solids are pumped from the lower portion of the anaerobic reactor 12 to a solids separator, which in the case of the example illustrated, is a hydrocyclone 74. In this regard, line 70 is operatively connected to the anaerobic reactor 12 and includes a pump 72. Line 70 and pump 72 are operatively connected to the solids separator 74 for directing mixed liquor including solids to the solids separator. Note that line 70 is connected to the reactor 12 such that mixed liquor is pulled from the bottom portion of the reactor 12. This, as explained above, is where the heavier solids are contained. In any event, the mixed liquor is pumped from the bottom portion of the reactor 12 through line 70 into the solids separator 74. Solids separator 74 produces an underflow which comprises solids that are heavier in nature and an overflow which comprises solids which are lighter in nature than the underflow. The overflow is pumped or fed through an overflow line 78 back to the anaerobic reactor 12 where it is mixed with the mixed liquor therein.

The underflow or heavier solids produced by the solids separator or hydrocyclone 74 is directed through underflow line 76 for further treatment. For example, the heavier solids produced in the underflow can be directed to a dewatering unit for dewatering and further concentration.

The solids removal process just described with respect to the solids separator 74 can be operated in parallel with the membrane separation unit 14. In some instances, the solids removal process may be operated continuously while the membrane separation unit 14 is filtering mixed liquor from the reactor 12. In other cases the solids removal process may be operated intermittently in order to maintain a selected SRT. The SRT can vary depending on circumstances, and conditions. It is contemplated that the SRT for the embodiments illustrated and discussed herein can range from approximately 15 to approximately 80 days.

The solids separator 74 is not an essential component of the present invention. There are situations when the solids separator 74 is not required. More particularly, the solids separator 74 and the process of removing solids from the bottom portion of the anaerobic reactor 12 is useful when the influent stream or the feedwater stream includes a substantial amount of dissolved solids that precipitate when undergoing treatment in the process of the present invention. Some feedwater streams will not include substantial dissolved solids that will precipitate and in those cases the solids separation process utilizing the solids separator 74 may not be a requirement in the process of the present invention.

For a more detailed understanding of anaerobic reactors and the process of anaerobic digestion, reference is made to the disclosures found in U.S. Publication No. 2002/0192809 and U.S. Publication No. 2008/0302721, the disclosures of which are expressly incorporated herein by reference.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of treating a waste stream having anaerobically biodegradable components, comprising:
   a. feeding a waste stream having the anaerobically biodegradable components into an anaerobic reactor;
   b. reacting the biodegradable components with anaerobic biomass in the anaerobic reactor to reduce the amount of biodegradable components and in the process produce biomass and biogas;
   c. stratifying the mixed liquor in the anaerobic reactor into three mixed liquor zones by forming a first lower mixed liquor zone in a lower portion of the anaerobic reactor where the mixed liquor in the first lower mixed liquor zone includes relatively heavy solids, forming a second mixed liquor zone above the first lower mixed liquor zone where the mixed liquor in the second mixed liquor zone includes a solids concentration substantially less than the concentration of solids in the first lower mixed liquor zone, and forming a third mixed liquor zone over the second mixed liquor zone where the third mixed liquor zone includes relatively light solids and includes a solids concentration less than the concentration of solids in the first lower mixed liquor zone;
   d. directing mixed liquor from the second mixed liquor zone in the anaerobic reactor to a membrane separation unit and separating the mixed liquor into a permeate stream and a retentate stream; and
   e. recycling at least a portion of the retentate stream to the anaerobic reactor and mixing the retentate stream with the mixed liquor in the reactor.

2. The method of claim 1 including mixing the mixed liquor in the first lower mixed liquor zone and mixing the mixed liquor in the third mixed liquor zone.

3. The method of claim 2 wherein the mixed liquor in the second mixed liquor zone is generally unmixed such that the mixing action in the first and third mixed liquor zones is greater than the mixing action in the second mixed liquor zone.

4. The method of claim 3 including providing one or more mixers in a lower portion of the anaerobic reactor for mixing the mixed liquor in the first lower mixed liquor zone; and providing one or more mixers in an upper portion of the anaerobic reactor for mixing the mixed liquor in the third mixed liquor zone.

* * * * *